United States Patent [19]

Harwood

[11] 3,740,461

[45] June 19, 1973

[54] DETECTOR CIRCUITS WITH SELF-REFERENCED BIAS

[75] Inventor: Leopold Albert Harwood, Somerville, N.J.

[73] Assignee: RCA Corporation, New York, N.Y.

[22] Filed: Apr. 10, 1972

[21] Appl. No.: 242,322

[52] U.S. Cl. .............................. 178/5.4 SD, 329/50

[51] Int. Cl. .............................................. H04n 9/50

[58] Field of Search ................ 178/5.4 SD; 329/50, 329/101

[56] References Cited

UNITED STATES PATENTS 3,513,256 5/1970 Bilotti .............................. 329/50 X

*Primary Examiner*—Robert L. Richardson

*Attorney*—Eugene M. Whitacre et al.

[57] ABSTRACT

A sample and hold arrangement is disclosed having two similar detectors which operate in a complementary manner during each operating cycle. One detector is keyed on during a sampling interval to store information which is to be sampled while the second detector is keyed off. During the remaining part of each cycle, the second detector is keyed on to store quiescent level information while the first detector is keyed off. The sampled information and quiescent level information are applied to a differential comparator to produce an output signal substantially independent of quiescent level variations.

9 Claims, 1 Drawing Figure

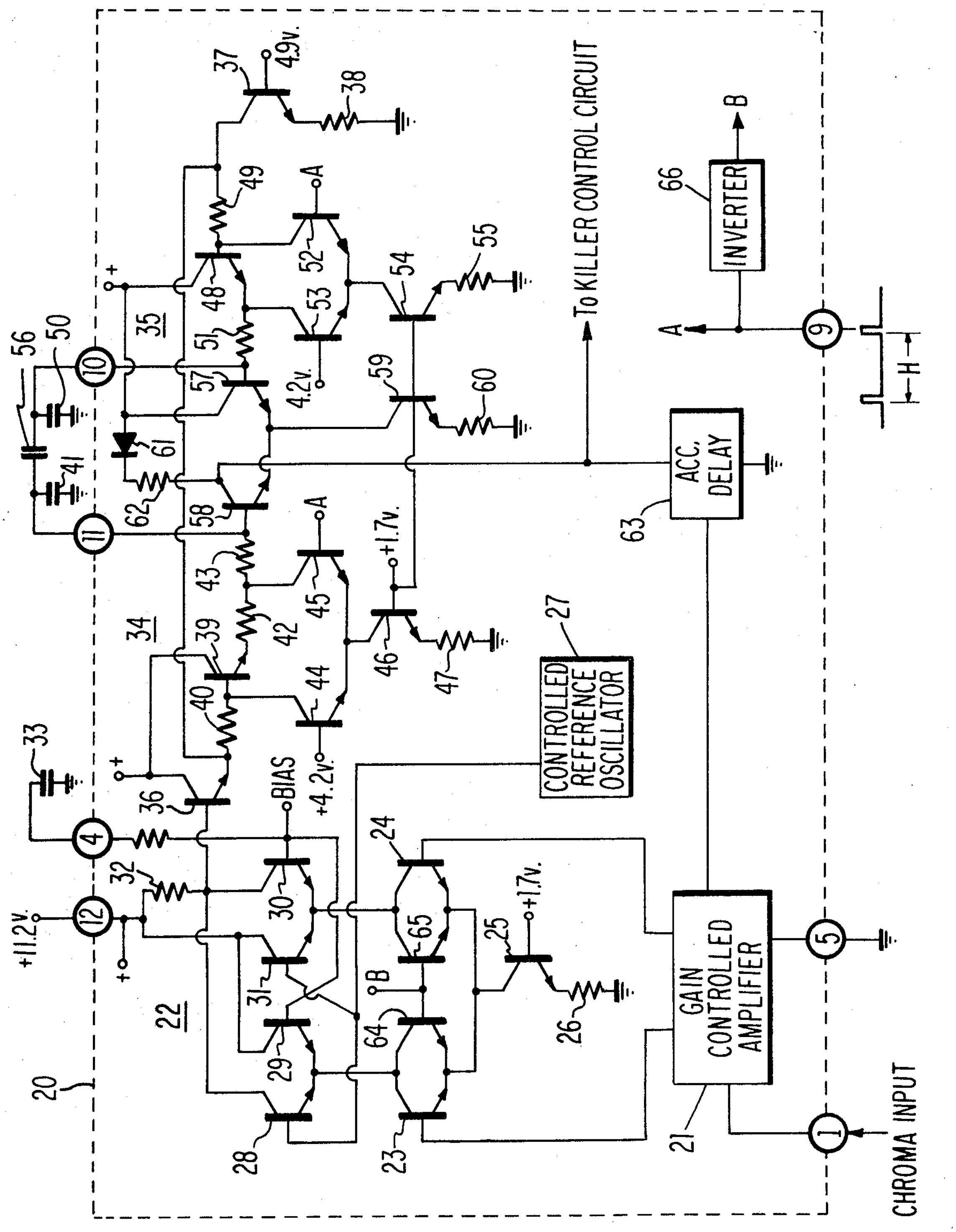
To KILLER CONTROL CIRCUIT
INVERTER
ACC. DELAY
CONTROLLED REFERENCE OSCILLATOR
GAIN CONTROLLED AMPLIFIER
CHROMA INPUT
BIAS
+4.2v.
4.2v.
4.9v.
+1.7v.
+11.2V.
H

DETECTOR CIRCUITS WITH SELF-REFERENCED BIAS

This invention relates to electronic signal detection circuits and, in particular, to detectors of the type commonly referred to as sample and hold detectors.

In many types of electronic control systems, such as automatic phase and frequency control (AFPC) and automatic gain control systems, a signal representative of a system condition is derived by a detector arrangement and is supplied to a control circuit either to reduce an error towards zero or to perform some other control function. The detected signal is usually produced as a voltage fluctuation measured with respect to a reference or quiescent voltage. The quiescent voltage may be different either from one piece of equipment to another as a function of component tolerances or, within the same piece of equipment, may fluctuate over a period of time as operating conditions and component values change. In such apparatus, the fluctuation must be maintained sufficiently small so as not to obscure the sensed error. In practice, such uncertainties are removed in large part by including an adjustable device such as a potentiometer for setting the operational threshold of the control apparatus.

For example, in a color television receiver, potentiometers are generally included to adjust the operating threshold of detector circuits such as are employed for automatic chroma control and color killer functions.

In present day color television receivers (as well as other electronic equipment) there is an increasing trend towards use of monolithic, integrated circuits. If external potentiometers are used in conjunction with such integrated circuits, one or more of the few available terminals of the integrated circuit will have to be used for coupling to the potentiometers. Since the number of such terminals is limited, the number of functions which can be performed on a single chip may be restricted if potentiometers are required.

In any case, it is desirable to reduce the number of adjustable components associated with a circuit such as a detector since such adjustable components are generally costly in themselves. Additionally, since such components must be adjusted either during the manufacture of the article or by servicing personnel, these components add to the labor costs of building and servicing the equipment.

One particular type of detector arrangement which may be employed in control systems such as are mentioned above is described in my copending U.S. Pat. application Ser. No. 242,321. The detector described therein includes a wide-band, balanced synchronous detector of the analog multiplier type to which a reference wave and a signal to be sampled are applied. Output signals, representative of a difference (either amplitude or phase) between the two input signals, are produced across a load resistor and are coupled to a signal sample and hold circuit. The sample and hold circuit comprises a filter capacitor and a switchable, bidirectional current source for charging or discharging the capacitor during a sampling interval according to the voltage appearing across the detector load resistor during that interval.

In accordance with the present invention, a further sample and hold circuit similar to the signal sample and hold circuit described above is also coupled to the detector load and is arranged to sample a quiescent potential which exists across the load during the portion of each operating cycle between sampling intervals. A differential comparator is coupled to each of the signal and further sample and hold detectors and is responsive to the difference between their outputs for providing indications of the detected signals which are substantially independent of quiescent potential Additional aspects of the present invention will be apparent to those skilled in the art upon a reading of the following description in connection with the accompanying drawing, in which the single FIGURE illustrates, partially in block diagram form and partially in schematic circuit diagram form, a detector arrangement embodying the present invention.

Referring to the drawing, a balanced synchronous detector and associated components suitable for construction in integrated circuit form on a single chip 20 of monolithic material such as silicon is shown. The detector is illustrated as it may be used to provide automatic chroma gain control (ACC) in a color television receiver. It should be recognized that this type of detector is suitable for other purposes as well. For example, in my above-referenced application Ser. No. 242,321, such a detector is described in connection with an automatic phase and frequency control (AFPC) system for a color oscillator. For convenience, the detector will be described in the present instance in the context of the ACC system.

In such a system, a source of reference signals, illustrated as a gain controlled chrominance amplifier 21, is coupled to a first pair of input terminals of a balanced synchronous detector 22 of the analog multiplier type. Chrominance signal components of a color television signal are coupled to amplifier 21 via terminal 1 of chip 20. The chrominance signals comprise a color image signal component imposed as amplitude modulation at selected phases of a suppressed color subcarrier wave and a color synchronizing burst component. The burst component typically comprises approximately eight cycles of unmodulated color subcarrier having a predetermined phase relationship with the suppressed subcarrier and transmitted during a synchronizing interval following the end of the transmission of each line of image information in the television signal.

Push-pull chrominance signals, including the amplitude modulated suppressed subcarrier and burst components, are coupled from amplifier 21 to the first pair of input terminals of detector 22. The first pair of input terminals comprise the base electrodes of a first pair of differentially coupled transistors 23 and 24. The emitters of transistors 23 and 24 are joined together and are coupled to the collector-emitter circuit of a transistor 25 arranged in a substantially constant current configuration. To this end, a resistor 26 is coupled between the emitter of transistor 25 and an internal chip reference potential (ground) while a compensated voltage supply (+1.7 v) is coupled to the base electrode of current source transistor 25.

A second pair of differentially connected transistors 28 and 29 is coupled to the collector of transistor 23 while a third pair of differentially connected transistors 30 and 31 is coupled to the collector of transistor 24. The bases of transistors 28 and 31 are joined together and provide one of the terminals of a second pair of input terminals of detector 22. A controlled reference oscillator 27, arranged to provide a continuous wave in synchronism with the color subcarrier is coupled to the bases of transistors 28 and 31. Oscillator 31 may be synchronized with the color subcarrier in the manner set forth in my application Ser. No. 242,321. The bases of transistors 29 and 30 are also joined together and provide a second one of the second pair of input terminals. In the illustrated embodiment, the joined bases of transistors 29 and 30 are coupled to a substantially constant bias potential ("BIAS") equal to the quiescent potential provided to the bases of transistors 28 and 31 from oscillator 27. The bases of transistors 29 and 30 are bypassed to ground for signal frequencies by means of an external capacitor 33 coupled between chip terminal 4 and ground.

The collectors of transistors 29 and 31 (one from each of the second and third pair) are joined together and are coupled to a source of operating potential (e.g., +11.2 volts). The collectors of the remaining transistors 28 and 30 of the second and third pairs are coupled via a load resistor 32 to the source of operating potential.

Keyed transistors 64 and 65 are coupled, respectively, with their collector-emitter paths in parallel with the collector-emitter paths of transistors 23 and 24. Periodic keying pulses (B) are supplied to the bases of keying transistors 64 and 65 to render transistors 64 and 65 conductive for predetermined intervals and non-conductive for complementary predetermined intervals of each operating cycle. In the case of a color television receiver, transistors 64 and 65 are conductive during the image portion of line scanning intervals to effectively disable transistors 23 and 24 (and therefore remove the effect of chroma subcarrier input signal components applied thereto). During line synchronizing intervals, transistors 64 and 65 are non-conductive, thereby permitting passage of color burst information to the emitters of the transistors of the second and third pairs 28, 29, 30, 31 via transistors 33 and 34. As is explained in U.S. Pat. application Ser. No. 89,583 of Erwin Wittmann, now U.S. Pat. No. 3,651,418, such a configuration maintains a substantially constant quiescent potential across output load resistor 32 as transistors 64 and 65 are switched from one state to the other.

Unfiltered output signals produced across resistive load circuit 32 are coupled via an isolating emitter follower transistor 36 to a signal sample and hold circuit 34 and to a bias sample and hold circuit 35.

In the signal sample and hold circuit 34, the emitter of follower transistor 36 is coupled via a resistor 40 to the base of a keyed follower transistor 39. The emitter of keyed follower transistor 39 is, in turn, coupled by means of series resistors 42 and 43 to a relatively small (0.01 microfarad) external filter capacitor 41, the capacitor 41 being coupled between terminal 11 of chip 20 and ground.

The signal sample and hold circuit 34 further comprises differential switching means having first and second switching transistors 44 and 45 coupled together in a differential arrangement and an associated current source transistor 46. A resistor 47 is coupled between ground and the emitter of current source transistor 46 while a reference bias potential (+1.7v) is coupled to the base of transistor 46. A substantially constant bias potential (+4.2 volts) is coupled to the base of transistor 44 is connected to the junction of resistor 40 and the base of transistor 39. The collector of the other transistor 45 of the differential signal switching means is connected to the junction of resistors 42 and 43. Keying pulses (A), which are inverted compared to those supplied to the bases of transistors 64 and 65, are supplied to the base of transistor 45 and serve to render transistor 45 conductive during the desired signal sampling (e.g., color burst) interval and non-conductive during the remainder of each operating cycle.

The bias sample and hold circuit 35 is similar to signal sample and hold circuit 34 and comprises a resistor 49 coupled between the emitter of follower transistor 36 and the base of a keyed follower transistor 48. A relatively long time constant network comprising a series resistor 51 and an external capacitor 50 (0.1 microfarad) is coupled between the emitter of keyed follower transistor 48 and ground. Capacitor 50 is coupled to chip terminal 10. In a preferred arrangement, resistors 40 and 49 are substantially equal (e.g., 2,000 ohms) while the sum of resistors 42 and 43 is substantially equal to resistor 51 (e.g., 5,000 ohms). Resistor 42 is relatively small (e.g., 100 ohms) and provides a slight offset in the system as will appear below.

The bias sample and hold circuit 35 further comprises differential switching transistors 52 and 53 having their collectors coupled, respectively, to the base and emitter of keyed follower transistor 48 and their emitters joined together at the collector of a current source transistor 54. A resistor 55 is connected between the emitter of current source transistor 54 and ground. A compensated bias potential (+1.7v) is coupled to the base of current source transistor 54. Keying pulses (A) are coupled to the base of switching transistor 52. It should be noted that, in the bias sample and hold circuit 35, transistor 52, to which keying pulses A are coupled, is connected to the base (input) of keyed follower transistor 48. In the signal sample and hold circuit 34, transistor 45, to which the same keying pulses A are coupled, is coupled via small resistor 42 to the emitter (output) of keyed follower transistor 39. As will be explained below, the effect of this different connection is that the signal and bias sample and hold circuits 34 and 35 operate in a complementary manner, i.e., while one is sampling the output of detector 22, the other is off and vice versa.

A differential comparator comprising transistors 57 and 58 is coupled between terminals 10 and 11. The emitters of transistors 57 and 58 are joined together and to the collector of a current source transistor 58. A resistor 60 is connected between the emitter of transistor 58 and ground. A compensated bias potential (+1.7 volts) is coupled to the base of transistor 59 to provide a substantially constant collector current in transistor 59.

The bases of differential comparator transistors 57 and 58 are coupled, respectively, to bias sampling capacitor 50 and to signal sampling capacitor 41. The collector of transistor 57 is connected to the operating voltage source (+) while the series combination of a diode 61 and a load resistor 62 is coupled between the collector of transistor 58 and the operating voltage source. Diode 61 provides temperature compensation for a following amplifier (not shown). An output representative of the detected signals and substantially independent of quiescent potential across detector load resistor 32 is coupled from the collector of transistor 58 to an ACC delay network 63. Delay network 63 comprises a threshold determining circuit which is coupled to amplifier 21. The collector of transistor 58 is also coupled to a color killer control circuit (not shown), details of which are set forth in my copending U.S. application Ser. No. 242,466.

Keying pulses, recurring at the line scanning rate (H) are coupled to chip terminal 9 from, for example, the horizontal or line scanning circuits of an associated television receiver. Waveform A having positive-going short duration pulses is provided at terminal 9. An inverter 66 is also coupled to terminal 9 to provide keying waveform B having negative-going short duration pulses. The detailed operation of the system will now be described.

In the automatic chroma control system, the amplitude of the burst component is sampled, during each burst interval to provide the desired chroma gain control signals. The operating cycle corresponds to each line scanning cycle, the burst sampling interval occurring near the end of each such cycle following the transmission of image-representative signals. Sampling pulses (A, B) required for use in such an environment therefore recur at the line scanning rate (approximately 15,750Hz under U.S. standards) and have a duration, for example, of the order of 8 microseconds.

In the quiescent condition of detector 22 (no signals applied and transistors 64 and 65 biased off), the current supplied by current source transistor 25 (typically 1 milliampere) divides substantially equally between similarly biased transistors 23 and 24. Similarly, the collector currents of transistors 23 and 24 divide substantially equally in the succeeding second and third pairs of differential transistors 28, 29 and 30, 31. The collector currents of transistors 28 and 30 are recombined in load resistor 32, the recombined current being substantially one-half the current supplied by transistor 25. A typical quiescent voltage drop across resistor 32 is 2 volts (i.e., resistor 32 typically is 4,000 ohms). With a main operating potential supply of 11.2 volts, the voltage at the base of transistor 36 is approximately 9.2 volts in the quiescent condition. The voltage at the emitter of transistor 36 therefore will be approximately 8.5 volts in this condition (1 $V_{be}$ lower).

Assuming, for the moment, that the keying pulse A (representing the occurrence of the sampling interval) is present, switching transistors 45 and 52 conduct. Transistors 44 and 53 are therefore cut off. The resistors 47 and 55 associated with current source transistors 46 and 54 are selected, for example, equal to twice resistor 26. A typical current of 0.5 milliamperes flows in each of transistors 46 and 54. These currents pass entirely through transistors 45 and 52. Transistor 48 also is cut off under these circumstances, transistor 52 serving to divert current which would otherwise flow to the base of transistor 48. In the signal sample and hold circuit 34, transistor 39 is conducting, producing a voltage substantially equal to +7.8 volts at its emitter. A current component equal to the current flowing in transistor 45 (0.5 milliampere) will flow through resistor 42, thereby reducing the effective voltage source coupled to capacitor 41 by 50 millivolts. Capacitor 41 will charge towards the voltage at the collector of transistor 45 via resistor 43 and transistor 45. When the sampling interval ends, transistors 45 and 52 are switched off and, by differential action, transistors 44 and 53 are switched on. After a number of cycles of such operation, capacitor 41 will charge sufficiently so that, when switching transistor 45 is switched off and transistor 44 switches on, the base-emitter voltage of transistor 39 will be of a polarity to cut off (reverse bias) transistor 39. Resistor 48 is selected sufficiently large so that the voltage drop across it produced by the collector current of transistor 44 is sufficient to ensure this reverse bias. Since transistors 39 and 45 are each cut off, the discharge path for capacitor 41 is substantially an open circuit. Therefore, capacitor 41 holds its charge until transistors 45 and 39 are again keyed on during the next sampling (burst) interval.

In the bias sample and hold circuit 35, the sampling or keying pulse A is applied to the opposite one of the switching transistors (52) as compared to transistor 45 to which sampling pulses are applied in the signal sample and hold circuit 34. Therefore, during the burst interval, transistors 48 and 53 are keyed off while transistor 52 is keyed on. Burst information does not affect the charge on capacitor 50. During the image line interval (a relatively long time period), transistor 52 is keyed off by the waveform A, permitting transistors 48 and 53 to conduct. At this time, transistors 64 and 65 are keyed on by waveform B, thereby disabling detector input transistors 23 and 24. Transistors 64 and 65 are substantially identical to transistors 23 and 24 and serve to establish the normal quiescent voltage across resistor 32 as was set forth above. Noise and chroma signals which would otherwise appear across resistor 32 are removed by the operation of transistors 64 and 65. The quiescent voltage across resistor 32 is coupled to transistor 36 and a resulting voltage $2V_{be}$ (1.4 volts) lower is produced at the emitter of transistor 48.

Thus, the quiescent voltage at the emitter of transistor 48 is derived from the same circuit point, the junction of load resistor 32 and the joined collectors of detection transistors 28 and 30, as the quiescent voltage at the emitter of transistor 39. Furthermore, the intervening circuit elements (36, 49, 48 in one case and 36, 40, 39 in the other) are substantially identical. In the absence of any input signals to detector 22, these two quiescent voltages will be equal. The resistor 42 causes the quiescent voltage across capacitor 41 to be slightly less (50 millivolts) than that across capacitor 50. The differential comparator transistors 58 and 57 will therefore be slightly unbalanced under quiescent conditions. That is, transistor 58 will be conducting less than transistor 57. This condition can be taken into account in the following ACC delay circuit 63. It serves the useful function that the linear operating range of transistor comparator 57, 58, for signals supplied to transistor 58, is increased over that which would be obtained if equal bias were applied to transistors 57 and 58. This feature is of advantage in the illustrated ACC system employing amplitude detection. It should be recognized, however, that in its broader aspects, the present invention may readily be practiced when the capacitors 41 and 50 are charged to equal quiescent voltages (see, for example, my application Ser. No. 242,321 referred to above).

In the operation of detector 22, during each burst sampling interval, transistors 64 and 65 are keyed off by waveform B. Push-pull burst components are then applied to transistors 23 and 24 at the same time that a continuous wave input, equal in frequency and fixed in phase with respect to the burst component, is supplied from oscillator 27 to the bases of transistors 28 and 31. The input from oscillator 27 may be either in phase or displaced 180° in phase from the applied burst for amplitude detection of the burst component. In the illustrated arrangement, a 180° relationship exists.

During each sampling interval when burst is present, detector 22 produces a wide-band output signal across load resistor 32 representative of the amplitude of the burst component. This signal (a voltage pulse) is coupled via transistors 36 and 39 to the capacitor 41. If the stored voltage on capacitor 41 is greater than the pulse amplitude at the collector of transistor 45, capacitor 41 discharges to the pulse voltage level through resistor 43 and transistor 45. This condition would represent a decrease in burst amplitude from a previous amplitude and would produce a decrease in conduction in comparator transistor 58. The ACC voltage at the collector of transistor 58 would rise and a compensating increase in gain of amplifier 21 would be produced. If, on the other hand, the detected burst increases, the voltage at the load resistor 32 increases, capacitor 41 charges via resistor 43 (and transistor 39) to a more positive level and transistor 58 increases conduction. A compensating decrease in gain of amplifier 21 will be produced.

Since bias sample and hold circuit 35 is keyed off during each burst sampling interval, the variations in signal produced across load resistor 32 have substantially no effect on the voltage across capacitor 50. If, however, due to supply voltage variations or other changes in operating conditions, the quiescent condition associated with load resistor 32 changes, bias sample and hold circuit 35, as well as signal sample and hold circuit 34 will follow such quiescent changes.

In each case, the filter capacitors 41 and 50 are charged or discharged during their respective sampling intervals by means of like, bidirectionally conductive current paths. In each case, the principal charging and discharging paths during respective sampling intervals includes a resistance (42, 43 and 51) and a transistor current supply (39 or 45 in one case and 48 or 53 in the other). The illustrated arrangement therefore responds to signal changes of either polarity with substantially equal facility.

While the invention has been described in terms of a preferred embodiment, various modifications within the scope of the invention will be apparent to persons familiar with these arts. Component values and other examples of operating parameters have been mentioned only as an aid to understanding the invention and are not intended to be limiting. What is claimed is:

1. Signal detection apparatus comprising:
a source of information signals to be sampled, the information recurring with respect to a quiescent level during a portion of each operating cycle,
first and second detectors coupled to said source,
keying means coupled to said first and second detectors for rendering said first detector operative during said portion of said operating cycle and inoperative during the remainder thereof and for rendering said second detector operative during said remainder and inoperative during said portion of said operating cycle, and
differential comparator means coupled to said first and second detectors for providing output signals representative of said sampled information and substantially independent of variations of said quiescent level.

2. Signal detection apparatus according to claim 1 wherein:
said keying means is coupled to said source for maintaining said source in quiescent condition during said remainder of each operating cycle.

3. Signal detection apparatus according to claim 2 wherein:
said source of information signals comprises a synchronous detector having first and second input terminals adapted for connection, respectively to a means for supplying signals having a characteristic which is to be sampled and to a means for supplying reference signals.

4. Signal detection apparatus according to claim 3 wherein:
said means for supplying signals having a characteristic to be sampled comprises a color television chrominance signal amplifier having an output including a periodically recurring color synchronizing burst component,
said means for supplying reference signals comprises means for generating a continuous wave at a frequency corresponding to the color subcarrier of a color television signal.

5. Signal detection apparatus according to claim 4 wherein:
said synchronous detector further comprises a wide-bandwidth load circuit and is further coupled to said keying means, said keying means being operative to enable said synchronous detector during the color burst portion of a received television signal and to switch said synchronous detector to a quiescent condition during said remainder of each operating cycle.

6. Signal detection apparatus according to claim 5 wherein:
said first and second detectors are coupled to said load circuit in parallel relation.

7. Signal detection apparatus according to claim 1 wherein:
each of said first and second detectors comprises a filter circuit having a resistance-capacitance time constant network, and
bidirectionally conductive current supplying means coupled to said filter circuit and responsive to said keying means for alternately providing a high impedance or a bidirectional current to said filter network.

8. Signal detection apparatus according to claim 7 wherein:
the filter circuit associated with said first detector is characterized by a shorter time constant than the filter circuit associated with said second detector.

9. Signal detection apparatus according to claim 8 wherein:
said differential comparator means comprises a differential amplifier including a first amplifier device having an input terminal coupled to the capacitance of the first of said filter circuits, a common terminal coupled to a current source and an output terminal coupled to a load circuit, said amplifier further comprising a second amplifier device having at least an input terminal coupled to the capacitance of the second of said filter circuits and a common terminal coupled to said current source.

* * * * *